United States Patent [19]

Straw

[11] Patent Number: 4,614,104
[45] Date of Patent: Sep. 30, 1986

[54] APPARATUS FOR SUPPORTING A BODY FOR RECIPROCAL MOVEMENT

[75] Inventor: David A. Straw, Arvada, Colo.

[73] Assignee: Ball Corporation, Muncie, Ind.

[21] Appl. No.: 818,406

[22] Filed: Jan. 13, 1986

Related U.S. Application Data

[63] Continuation of Ser. No. 644,228, Aug. 27, 1984, abandoned.

[51] Int. Cl.$^4$ ............................................. B21D 22/20
[52] U.S. Cl. ........................................ 72/347; 72/349; 72/456; 384/300
[58] Field of Search ................. 72/347, 348, 349, 456; 308/6 R; 384/300

[56] References Cited

U.S. PATENT DOCUMENTS

| | | | |
|---|---|---|---|
| 461,917 | 10/1891 | Beaudry. | |
| 2,005,328 | 6/1935 | Smith | 205/4 |
| 2,482,678 | 9/1949 | Laxo | 113/12 |
| 2,652,801 | 9/1953 | Laxo | 113/12 |
| 2,703,024 | 3/1955 | Albers et al. | 76/37 |
| 3,097,892 | 7/1963 | Newbury | 308/6 R |
| 3,221,690 | 12/1965 | Laxo | 113/12 |
| 3,293,900 | 12/1966 | Clements | 72/456 |
| 3,524,338 | 8/1970 | Bozek | 72/345 |
| 3,587,288 | 6/1971 | Sharman | 72/450 |
| 3,696,657 | 10/1972 | Maytag | 72/450 |
| 3,702,559 | 11/1972 | Hasselbeck et al. | 72/345 |
| 3,804,479 | 4/1974 | Butzow et al. | 384/300 |
| 3,889,509 | 6/1975 | Miller et al. | 72/349 |
| 3,948,078 | 4/1976 | Cartwright | 72/456 |
| 3,986,382 | 10/1976 | Miller et al. | 72/347 |
| 4,346,945 | 8/1982 | Tsuboi | 384/549 |

Primary Examiner—Francis S. Husar
Assistant Examiner—Jerry Kearns
Attorney, Agent, or Firm—Gilbert E. Alberding

[57] ABSTRACT

A support for a reciprocating ram wherein a plurality of rollers having angularly related generally cylindrical support surfaces are mounted in a fixed location and the ram is provided with planar surfaces having the same corresponding angular relationship wherein the weight of the ram is utilized to maintain the planar surfaces in contact with the generally cylindrical support surfaces during reciprocal movement of the ram with dampening means being provided to minimize vibrations. An additional force is applied to the ram to ensure a rolling relationship between the planar and generally cylindrical surfaces at all times during the reciprocal movement.

9 Claims, 2 Drawing Figures

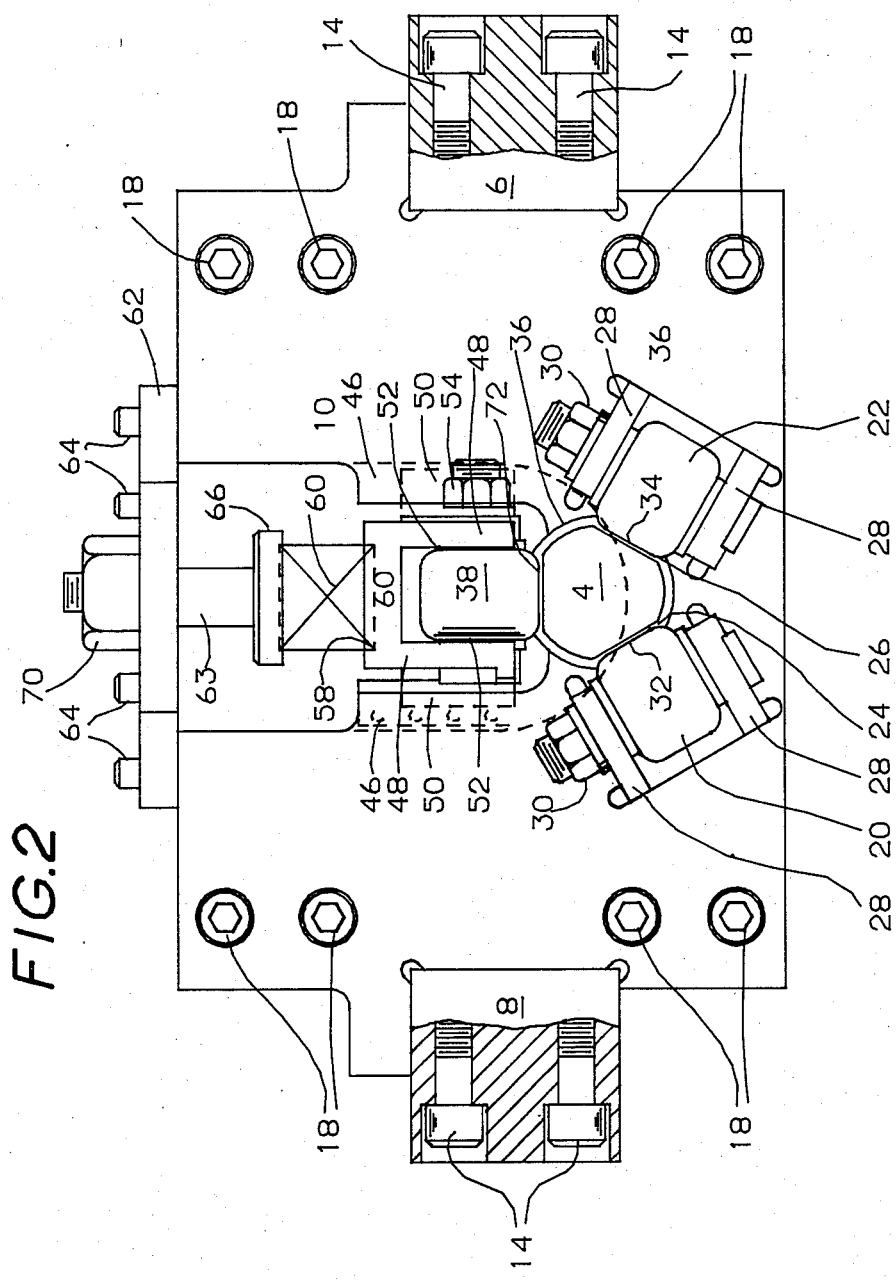

APPARATUS FOR SUPPORTING A BODY FOR RECIPROCAL MOVEMENT

This application is a continuation of application Ser. No. 644,288 filed Aug. 27, 1984 now abandoned.

FIELD OF INVENTION

This invention relates to a support for an elongated body so that the elongated body may be subjected to reciprocating movement and more particularly to apparatus for supporting a ram for reciprocating movement in a generally horizontal direction such as a ram used in machines for forming metal such as a can forming machine.

BACKGROUND OF THE INVENTION

There are many different processes and machines which utilize a body that is reciprocated back and forth to perform work. There have always been problems in supporting such a reciprocating body, particularly when the reciprocation is in a horizontal direction. This problem exists in some of the machines used to form can bodies.

A typical method of manufacturing two piece cans consists of making a circular blank and then drawing the blank to form a shallow cup. The cup is fed in position ahead of a punch attached to the ram, and then is formed by the ram through a redraw die and a plurality of ironing dies located in a tool pack housing.

Presses for directing the movement of the ram may be either mechanical or hydraulic. Exemplary of mechanical machines are U.S. Pat. No. 3,702,559 to Hasselback et al. entitled "Can Bodymaking Machine" and 3,696,675 to Maytag entitled "Metal Working Crank and Slide Press Mechanism". The ram in the Hasselback invention slides on guides with an attached cam follower cooperating with cam grooves on a barrel cam. The barrel cam is mounted on a shaft driven by an electric motor. The ram in the Maytag invention is mounted on a carriage with wheels which run on the top and bottom surfaces of hardened way strips. The wheels are adjusted with a predetermined amount of preload to avoid slack in the wheels. The carriage is driven by a crank and connecting rod attached to a parallel motion assembly.

Typically, mechanically driven rams can be driven at high speeds but do not always provide uniform punch speed or travel in a straight line motion, which is critical to continuously producing uniform can walls. The Maytag invention overcomes some of these problems but the movement of a heavy carriage upon which the ram rides inherently requires a significant amount of service time. Wear items such as bearings and cam followers must constantly be replaced. When such items are replaced, the complete ram system must be calibrated and each wheel individually loaded. Regrinding the hardened way strips also contributes to the significant "down time." Reducing "down time" and increasing efficiency is significant in light of the fact that can bodymachines typically run 24 hours per day and produce cans at rates in the range of about 150-230 cans per minute.

SUMMARY OF THE INVENTION

It is an object of this invention to support an elongated body while permitting reciprocal movement of the elongated body in a generally horizontal direction.

It is another object of this invention to support an elongated body while permitting reciprocal movement of the elongated body at rates of hundreds of times a minute in a generally horizontal direction with a minimum of body rotation and deviation from a straight line motion.

It is a further object of this invention to support an elongated body while permitting reciprocal movement of the elongated body at rates of hundreds of times a minute in a generally horizontal direction utilizing the weight of the elongated body to maintain the elongated body in contact with the support.

It is a further object of this invention to support an elongated body while permitting reciprocal movement of the elongated body at rates of hundreds of times a minute in a generally horizontal direction utilizing the weight of the elongated body to maintain the elongated body in contact with the support and to dampen out vibrations caused by the change in direction of movement of the elongated body and/or the work performed by the elongated body.

The foregoing objects are accomplished by this invention by providing means for supporting an elongated body while permitting reciprocal movement of the elongated body and is particularly means for supporting a reciprocal ram used in apparatus for forming can bodies. The invention also provides means for dampening vibrations so as to limit damage to the apparatus normally resulting from such vibrations. Also, by minimizing vibrations, the can making efficiency is increased.

In the preferred embodiment of the invention a ram cradle assembly and a ram having an outer surface shaped to cooperate with angularly related surfaces on the ram cradle assembly are substituted for the carriage and hardened way strips of the apparatus disclosed in the Maytag patent. The ram cradle assembly comprises at least two spaced apart supports wherein each support comprises two angularly related rollers having generally cylindrical surfaces. A ram is provided with two angularly related planar surfaces extending in a direction generally parallel to the longitudinal axis of the ram. The angular relationship of the planar surfaces is the same as the angular relationship of the rollers so that the ram may be supported by the ram cradle assembly with the planar surfaces on the ram in contact with the cylindrical surfaces of the rollers. The weight of the ram is generally sufficient to insure that the ram remains in contact with the rollers. However, in the preferred embodiment, additional means are provided to apply a force urging the ram into firmer contact with the rollers. This force applying means comprises at least one roller having a generally cylindrical outer surface but in the preferred embodiment comprises two spaced apart rollers, each of which has a generally cylindrical outer surface. The ram is provided with another planar surface extending in a direction generally parallel to the longitudinal axis of the ram and located so that it will be contacted by the force applying rollers. Any means, such as a spring, may be used to apply the force to the force applying rollers.

The dampening means, in the preferred embodiment of the invention, comprises a rope packing that is supported on the ram cradle assembly and is in circumferential contact with the adjacent portions of the outer surface of the ram. The preferred rope packing comprises Teflon coated cotton or fiberglass rope.

Other objects and advantages of the invention will be apparent from the following more particular description of preferred embodiments as illustrated in the accompanying drawings in which like reference characters refer to the same parts throughout the various views. The drawings are not necessarily to scale, emphasis instead being placed upon illustrating the principles of the invention.

BRIEF DESCRIPTION OF THE DRAWING

FIG. 2 is a view in cross-section taken on the line 2—2 of FIG. 1.

DETAILED DESCRIPTION OF THE INVENTION

Figure 1:
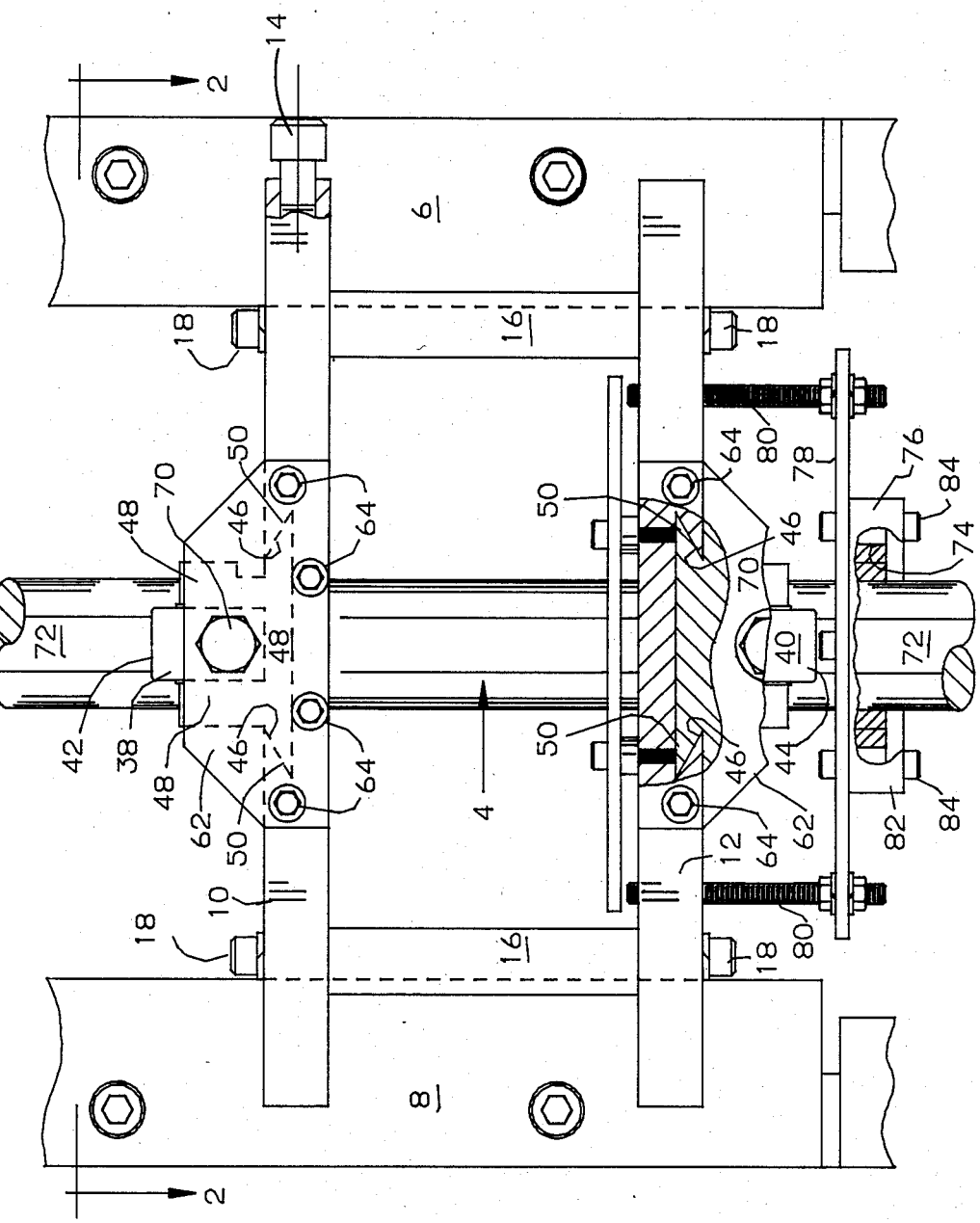
FIG. 1 is a top plan view of the apparatus of this invention.

In FIG. 1, there is illustrated a ram cradle assembly 2 which, in the preferred embodiment of the invention, is mounted on the frame 10 illustrated in FIG. 2 of the Maytag patent. The end portion (not shown) of the ram 4 extending from the right side of FIG. 1 is connected to the straight line motion assembly 20 of FIG. 2 of the Maytag patent. The end portion (not shown) of the ram 4 extending from the left side of FIG. 1 is connected to the redraw sleeve 40 of FIG. 2 of the Maytag patent. Thus, the ram cradle assembly 2 and the ram 4 of this invention have been substituted for the ram carriage 26 and the ram 27 of the Maytag patent, which patent is incorporated herein by reference. While the preferred embodiment is illustrated for use in the apparatus disclosed in the Maytag patent, it is understood that the concepts of this invention may be used with any mechanism wherein a body needs to be supported so that the body can be reciprocated in a generally horizontal direction at various rates of reciprocation, such as hundreds of times a minute.

The ram cradle assembly 2 comprises a pair of bases 6 and 8 secured to the frame 10 in FIG. 2 of the Maytag patent. Support plates 10 and 12 extend between the bases 6 and 8 and are secured to each base by suitable means such as the threaded bolts 14. A plurality of spacer blocks 16 extend between the support plates 10 and 12 and are secured in place by threaded bolts 18.

A pair of freely rotatable support rollers 20 and 22 (FIG. 2) having angularly related generally cylindrical outer surfaces 24 and 26 are mounted in recesses in each of the plates 10 and 12 and secured thereto by suitable means such as bolts (not shown). As illustrated in FIG. 2, the rollers 20 and 22 are mounted between a pair of spaced apart lugs 28 and held in position by nuts 30. The ram 4 is provided with two angularly related planar surfaces 32 and 34, each of which extends in a direction generally parallel to the longitudinal axis of the ram 4. An opening 36 is provided in each of the plates 10 and 12 to provide for the passage of the ram 4 through the plates 10 and 12. The ram 4 is supported on the rollers 20 and 22 so that the planar surface 32 is in contact with and supported by generally cylindrical outer surface 24 and the planar surface 34 is in contact with and supported by generally cylindrical outer surface 26. The weight of the ram 4 cooperates with the angular relationship of the planar surfaces 32 and 34 and the angular relationship of the generally cylindrical outer surfaces 24 and 26 to restrain the longitudinal axis of the ram 4 from movement in any direction perpendicular to the longitudinal axis during the reciprocal movement of the ram 4. Although only two rollers and two planar surfaces are illustrated in FIG. 2, it is to be understood that more than two rollers and two planar surfaces may be used. In all instances, the angular relationship of the planar surfaces corresponds to the angular relationship of the generally cylindrical outer surfaces of the rollers.

As stated above, the weight of the ram is sufficient to hold it in position during the reciprocal movement. However, it is highly desirable that there be no sliding movement between the planar surfaces on the ram and the generally cylindrical outer surfaces on the roller. This is particularly so at the end of the reciprocal movement in the one direction and the start of movement in the opposite direction. Therefore, means are provided to ensure a relative rolling relationship between the planar surfaces on the ram and the generally cylindrical surfaces on the roller. The preferred embodiment for accomplishing this rolling relationship is illustrated in FIGS. 1 and 2 and comprises a pair of such means providing rollers 38 and 40 having generally cylindrical outer surfaces 42 and 44 and mounted on the plates 10 and 12. The mounting means comprises dovetail recesses 46 in the lower central portion of the plates 10 and 12. Each roller 38 and 40 is mounted for rotation in a generally U-shaped frame 48 having dovetailed projections 50 to mate with the dovetail recesses 46. The U-shaped frame 48 is provided with openings in which bearing means 52 are mounted and secured in position by a nut 54. A plate 56 is secured to the upper surface of the U-shaped frame 48 and is provided with a recess 58 in which the lower portion of the spring 60 is seated. A plate member 62 is mounted on the upper surface of the plates 10 and 12 and secured thereto by threaded bolts 64. The upper portion of the spring 60 is seated in a recess in a plate 66 having a threaded member 68 projecting therefrom and extending through an opening in the plate member 62. The relationship between the dovetail recesses 46 and the dovetailed projections 50 on the U-shaped frame 48 is such that the rollers 38 and 40 may move in a vertical direction but are restrained from movement in a horizontal direction. A nut 70 is secured to the plate member 62 by suitable means (not shown) so that the nut 70 may be rotated but is restrained from movement in a vertical direction and is threaded on the member 68 so that the tension of the spring 60 may be adjusted by rotation of the nut 70. Each of the preferred pair of the means to provide a relative rolling relationship through each of rollers 38 and 40 is, as shown in FIGS. 1 and 2, substantially identical. The ram 4 is provided with a planar surface 72 and, as illustrated in FIG. 2, is in contact with the generally cylindrical surface 42 of the roller 38. The springs 60 function to maintain the the rollers 38 and 40 in contact with the planar surface 72 and to apply an additional force on the ram 4 to ensure the desired rolling relationship between the planar surfaces and the generally cylindrical surfaces. The amount of force applied by rollers 38 and 40 is controlled by adjustment of each of the springs 60.

In the preferred embodiment of the invention, the ram 4 is reciprocated at rates of hundreds of times per minute. In order to minimize vibrations, dampening means are provided. In the preferred embodiment, the dampening means comprises as shown in FIG. 1, a rope packing 74 in contact with the outer surface of the ram 4. The rope packing 74 is mounted in a holder 76 secured to a plate 78 mounted in spaced relationship to the plate 12 by spacing means 80. A packing push plate 82 is mounted on the holder 76 by threaded bolts 84. The rope packing 74 is a conventional half and half rope packing formed from Teflon coated cotton or fiberglass.

While the preferred embodiments of the invention have been illustrated and described herein, it may be otherwise embodied and practiced within the scope of the following claims.

What is claimed is:

1. In a machine for forming can bodies, said machine comprising a ram supported by a frame for reciprocal movement along a horizontal path, said ram being provided with support surfaces comprising at least two planar surfaces extending in a direction generally parallel to the longitudinal axis of said ram, said planar surfaces being circumferentially spaced apart from each other, a pair of horizontally spaced apart supporting means each comprising roller means mounted ot said frame and in line contact across the width of each of said spaced apart planar surfaces, each roller means straddling the plunar surfaces that lie adjacent to each roller means and extending to a width exceeding the adjacent width of the planar surface, each roller means mounted for rotation and openly exposed over substantially the full extent of said roller means, dampening means affixed to the frame and in contact with the outer surface of said ram during its reciprocal movement along the horizontal path, said dampening means being positioned between said roller means and the end of said ram, at least one freely rotatable roller secured to the frame and having a generally cylindrical outer surface, a third planar surface on said ram extending in a direction generally parallel to said longitudinal axis, the at least one freely rotatable roller straddling the third planar surface to a width exceeding the width of the third planar surface, said rotatable roller being openly exposed over substantially the full extent thereof, and means for urging said one freely rotatable roller into contact with said third planar surface whereby the means for supporting in conjunction with the means for urging provide straight horizontal line movement without deviation or rotation during the reciprocal movement of said ram.

2. An apparatus as recited in claim 1 in which the dampening means include a rope packing mounted within a holder means for contact with the outer surface of said ram.

3. An apparauts as recited in claim 1 in which the means for urging said one freely rotatable roller includes spring means for applying a force to said roller to thereby urge said roller against said third planar surface.

4. In combination with a machine for forming can bodies comprising a ram supported by a frame for reciprocal movement along a horizontal path, said ram being provided with support surfaces extending in a direction generally parallel to the longitudinal axis of said ram, a pair of horizontally spaced apart supporting means each comprising roller means mounted to said frame and in contact with each of said pair of spaced apart planar surfaces, the improvement which comprises: each of said roller means straddling the planar surfaces that lie adjacent to each roller means and extending to a width exceeding the adjacent width of the planar surface, each roller means being mounted for rotation and openly exposed over substantially the full extent of said roller means, dampening means being affixed to the frame and in contact with the outer surface of said ram during its reciprocal movement along the horizontal path, said dampening means being positioned between said roller means and the end of said ram, at least one freely rotatable roller being secured to said frame and having a generally cylindrical outer surface, a third planar surface on said ram extending in a direction generally parallel to said longitudinal axis, the at least one freely rotatable roller straddling the third planar surface to a width exceeding the width of the third planar surface, said rotatable roller being openly exposed over substantially the full extent thereof, and means for urging said one freely rotatable roller into contact with said third planar surface whereby the means for supporting in conjunction with the means for urging provide straight horizontal line movement without deviation or rotation during the reciprocal movement of said ram.

5. In a machine for forming can bodies, said machine comprising a ram supported by a frame for reciprocal movement along a horizontal path, said ram being provided with support surfaces comprising at least two planar surfaces extending in a direction parallel to the longitudinal axis of said ram, said planar surfaces being circumferentially spaced apart from each other, a pair of horizontally spaced apart supporting means each comprising roller means mounted to said frame and affixed thereto for non-reciprocal movement, said roller means being in contact with each of said spaced apart planar surfaces, each roller means mounted for rotation and openly exposed over substantially the full extent of said roller means, dampening means affixed to the frame and in contact with the outer surface of said ram during its reciprocal movement along the horizontal path, said dampening means being positioned between said roller means and the end of said ram, at least one freely rotatable roller secured to the frame and having a generally cylindrical outer surface, a third planar surface on said ram extending in a direction parallel to said longitudinal axis, and means for urging said one freely rotatable roller into contact with said third planar surface whereby the means for supporting in conjunction wih the means for urging provide straight horizontal line movement without deviation or rotation during the reciprocal movement of said ram.

6. In combination with a machine for forming can bodies comprising a ram supported by a frame for reciprocal movement along a horizontal path, said ram being provided with support surfaces extending in a direction generally parallel to the longitudinal axis of said ram, a pair of horizontally spaced apart supporting means each comprising roller means mounted to said frame and in contact with each of said pair of spaced apart planar surfaces, the improvement which comprises: each of said roller means straddling the planar surfaces that lie adjacent to each roller means and extending to a width exceeding the adjacent width of the planar surface, each roller means being mounted for rotation, dampening means being affixed to the frame and in contact with the outer surface of said ram during its reciprocal movement along the horizontal path, said dampening means being positioned between said roller means and the end of said ram, at least one freely rotatable roller being secured to said frame and having a generally cylindrical outer surface, a third planar surface on said ram extending in a direction generally parallel to said longitudinal axis, the at least one freely rotatable roller straddling the third planar surface to a width exceeding the width of the third planar surface, and means for urging said one freely rotatable roller into contact with said third planar surface whereby the means for supporting in conjunction with the means for urging provide straight horizontal line movement without deviation or rotation during the reciprocal movement of said ram.

7. A machine for forming can bodies, said machine comprising a ram supported by a frame for reciprocal movement along a horizontal path, said ram being provided with support surfaces comprising at least two planar surfaces extending in a direction parallel to the longitudinal axis of said ram, said planar surfaces being circumferentially spaced apart from each other, a pair of horizontally spaced apart supporting means each comprising roller means mounted to said frame, said roller means being in contact with each of said spaced apart planar surfaces, each roller means being mounted for rotation, dampening means affixed to the frame and in contact with the outer surface of said ram during its reciprocal movement along the horizontal path, said dampening means being positioned between said roller means and the end of said ram, at least one freely rotatable roller secured to the frame and having a generally cylindrical outer surface, a third planar surface on said ram extending in a direction parallel to said longitudinal axis, and means for urging said one freely rotatable roller into contact with said third planar surface whereby the means for supporting in conjunction with the means for urging provide straight horizontal line movement without deviation or rotation during the reciprocal movement of said ram.

8. An apparatus as recited in claim 7 in which the dampening means includes a rope packing mounted within a holder means for contact with the outer surface of said ram.

9. An apparatus as recited in claim 7 in which the means for urging said one freely rotatable roller includes spring means for applying a force to said roller to thereby urge said roller against said third planar surface.

* * * * *